(12) United States Patent
Rogers (10) Patent No.: US 11,338,910 B2
(45) Date of Patent: May 24, 2022

(54) INTEGRATED LANDING GEAR FIRE DETECTION AND FATIGUE MONITORING SYSTEM

(71) Applicant: Kidde Technologies, Inc., Wilson, NC (US)

(72) Inventor: Aaron Stanley Rogers, Surf City, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 378 days.

(21) Appl. No.: 16/517,982

(22) Filed: Jul. 22, 2019

(65) Prior Publication Data
US 2021/0024200 A1    Jan. 28, 2021

(51) Int. Cl.
| | | |
|---|---|---|
| *H04B 10/00* | (2013.01) |
| *B64C 25/00* | (2006.01) |
| *B64C 19/02* | (2006.01) |
| *G01M 11/00* | (2006.01) |
| *H04B 10/2537* | (2013.01) |
| *H04J 14/00* | (2006.01) |

(52) U.S. Cl.
CPC .......... *B64C 25/001* (2013.01); *B64C 19/02* (2013.01); *G01M 11/3145* (2013.01); *H04B 10/2537* (2013.01)

(58) Field of Classification Search
CPC .. H04B 10/071; G01K 11/32; G01K 11/3206; G01K 11/3213; G01K 11/324
See application file for complete search history.

(56) References Cited

U.S. PATENT DOCUMENTS

| | | | |
|---|---|---|---|
| 6,960,019 B2 | 11/2005 | Dammann | |
| 8,235,326 B2 | 8/2012 | Briancourt et al. | |
| 10,112,726 B2 | 10/2018 | Wilson et al. | |
| 2008/0297808 A1* | 12/2008 | Riza ................... | G01B 9/02072 356/503 |
| 2017/0322069 A1* | 11/2017 | Mastrianni ............. | G01G 19/12 |
| 2017/0336268 A1* | 11/2017 | Wilson ................... | G01K 11/32 |
| 2018/0340841 A1 | 11/2018 | Coreth et al. | |

FOREIGN PATENT DOCUMENTS

| | | |
|---|---|---|
| EP | 2434262 A1 | 3/2012 |
| EP | 2669637 A2 | 12/2013 |
| EP | 3121576 A1 | 1/2017 |
| EP | 3246683 A1 | 11/2017 |
| EP | 3333561 A1 | 6/2018 |
| WO | 2015069623 A1 | 5/2015 |

OTHER PUBLICATIONS

The Extended European Search Report for Application No. 19212697.7-1010; Report dated Jun. 16, 2020; Report dated Jul. 10, 2020; 8 pages.

* cited by examiner

*Primary Examiner* — Daniel G Dobson
(74) *Attorney, Agent, or Firm* — Cantor Colburn LLP (57) ABSTRACT

A system for an aircraft that includes a plurality of zones including: a first fiber optic cable routed through a zone of the plurality of zones. The first fiber optic cable is attached to a landing gear of the aircraft in the zone of the plurality of zones; and a first controller configured to provide a first optical signal to the first fiber optic cable and obtain a first optical response signal from the first fiber optic cable. The first controller is further configured to determine at least one temperature within the zone of the plurality of zones based on the first optical response signal, the first optical signal, and coherent optical frequency domain reflectometry (COFDR).

18 Claims, 7 Drawing Sheets

INTEGRATED LANDING GEAR FIRE DETECTION AND FATIGUE MONITORING SYSTEM

BACKGROUND

The subject matter disclosed herein generally relates to aircraft landing gear system health monitoring, and more specifically to aircraft landing gear system health monitoring using optical signals.

Overheat detection systems monitor various zones within an aircraft, such as pneumatic bleed air ducts where high temperature, high pressure air is bled from the compressor stage of an engine to demand loads, or in the main landing gear wheel wells of an aircraft to sense overheated brakes and/or tire fires. Overheat detection systems can be used for any equipment on the aircraft that requires monitoring for overheat conditions, such as electric motors, compressors, etc.

Prior art overheat detection systems typically utilize eutectic salt technology to sense an overheat event. The eutectic salt surrounds a central conductor and the eutectic salt is surrounded by an outer protected metallic sheath. A monitoring signal is sent down the central conductor, and under normal operating conditions the eutectic salt operates as an insulator such that no conduction occurs between the central conductor and the outer sheath. When an overheat event occurs, however, a portion of the eutectic salt melts and a low-impedance path is formed between the central conductor and the outer sheath. The low-impedance path is sensed by an electronic controller, which generates an overheat alarm signal. When the overheat event has subsided, the eutectic salt re-solidifies and once again insulates the central conductor. Through the use of various chemicals to create a eutectic mixture, a specific melting point for the salt can be achieved; thereby allowing different eutectic salts to be used in different areas of the aircraft to provide overheat monitoring across a variety of temperatures. While the eutectic salt technology allows for overheat events to be detected, the eutectic salt technology merely provides a binary indication of whether an overheat event has or has not occurred.

BRIEF SUMMARY

According to one embodiment, a system for an aircraft that includes a plurality of zones is provided. The system including: a first fiber optic cable routed through a zone of the plurality of zones. The first fiber optic cable is attached to a landing gear of the aircraft in the zone of the plurality of zones; and a first controller configured to provide a first optical signal to the first fiber optic cable and obtain a first optical response signal from the first fiber optic cable. The first controller is further configured to determine at least one temperature within the zone of the plurality of zones based on the first optical response signal, the first optical signal, and coherent optical frequency domain reflectometry (COFDR).

In addition to one or more of the features described above, or as an alternative, further embodiments may include that the first controller is further configured to provide an indication that the at least one temperature is greater than a threshold temperature value within the zone of the plurality of zones.

In addition to one or more of the features described above, or as an alternative, further embodiments may include that the first controller is further configured to determine at least one strain within the zone of the plurality of zones based on the first optical response signal, the first optical signal, and COFDR.

In addition to one or more of the features described above, or as an alternative, further embodiments may include that the first controller is further configured to provide an indication that the at least one strain is greater than a threshold strain value within the zone of the plurality of zones.

In addition to one or more of the features described above, or as an alternative, further embodiments may include that the first fiber optic cable is routed through a second zone of the plurality of zones.

In addition to one or more of the features described above, or as an alternative, further embodiments may include that the second zone of the plurality of zones is one of a bleed air duct, a cross-over bleed air duct, wing box, air conditioning system, anti-icing system or nitrogen generation system.

In addition to one or more of the features described above, or as an alternative, further embodiments may include that the second zone of the plurality of zones is a bleed air duct.

In addition to one or more of the features described above, or as an alternative, further embodiments may include: a second fiber optic cable routed through a second zone of the plurality of zones; and a second controller configured to provide a second optical signal to the second fiber optic cable and obtain a second optical response signal from the second fiber optic cable. The second controller is further configured to determine at least one temperature within the second zone of the plurality of zones based on the second optical response signal and provide an indication for second detected zones of the second zone of the plurality of zones in which the at least one temperature is greater than a threshold temperature value.

In addition to one or more of the features described above, or as an alternative, further embodiments may include a main controller configured to communicate with the first controller and the second controller. The first controller and the second controller provide to the main controller the at least one temperature within the zone of the plurality of zones and the at least one temperature within the second zone of the plurality of zones.

In addition to one or more of the features described above, or as an alternative, further embodiments may include that the first fiber optic cable includes fiber Bragg gratings. The first controller is configured to control an optical transmitter to provide the optical signal as a tunable swept-wavelength laser and/or a broadband laser and is configured to determine the at least one temperature within the zone of the plurality of zones using time division multiplexing (TDM) and/or wavelength division multiplexing (WDM).

According to another embodiment, a method of detecting thermal conditions for an aircraft is provided. The method including: emitting, by a first controller, a first optical signal using a broadband laser to a first fiber optic cable that includes fiber Bragg gratings, wherein the first fiber optic cable is routed through a zone of a plurality of zones of the aircraft, and wherein the first fiber optic cable is attached to a landing gear of the aircraft in the zone of the plurality of zones; receiving, by the first controller, a first optical response signal from the first fiber optic cable based upon the first optical signal; and determining, using the first controller, at least one temperature within the zone of the plurality of zones based on the first optical response signal, the first optical signal, and coherent optical frequency domain reflectometry (COFDR).

In addition to one or more of the features described above, or as an alternative, further embodiments may include:

indicating a first condition for the zone of the plurality of zones if the at least one temperature within the zone of the plurality of zones is greater than a threshold temperature value.

In addition to one or more of the features described above, or as an alternative, further embodiments may include that emitting, by the first controller, the first optical signal includes emitting laser pulses having a constant amplitude using a step frequency methodology.

In addition to one or more of the features described above, or as an alternative, further embodiments may include that determining, using the first controller, the at least one temperature of each of the first plurality of zones includes determining the at least one temperature based on optical frequency domain reflectometry (IOFDR).

In addition to one or more of the features described above, or as an alternative, further embodiments may include: determining, using the first controller, at least one strain within the zone of the plurality of zones based on the first optical response signal, the first optical signal, and COFDR.

In addition to one or more of the features described above, or as an alternative, further embodiments may include that the first fiber optic cable is routed through a second zone of a plurality of zones of the aircraft.

In addition to one or more of the features described above, or as an alternative, further embodiments may include: determining, using the first controller, at least one temperature within the second zone of the plurality of zones based on the first optical response signal, the first optical signal, and COFDR.

In addition to one or more of the features described above, or as an alternative, further embodiments may include: determining, using the first controller, at least one strain within the second zone of the plurality of zones based on the first optical response signal, the first optical signal, and COFDR.

In addition to one or more of the features described above, or as an alternative, further embodiments may include that the second zone of the plurality of zones is one of a bleed air duct, a cross-over bleed air duct, wing box, air conditioning system, anti-icing system or nitrogen generation system.

In addition to one or more of the features described above, or as an alternative, further embodiments may include that the second zone of the plurality of zones is a bleed air duct.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
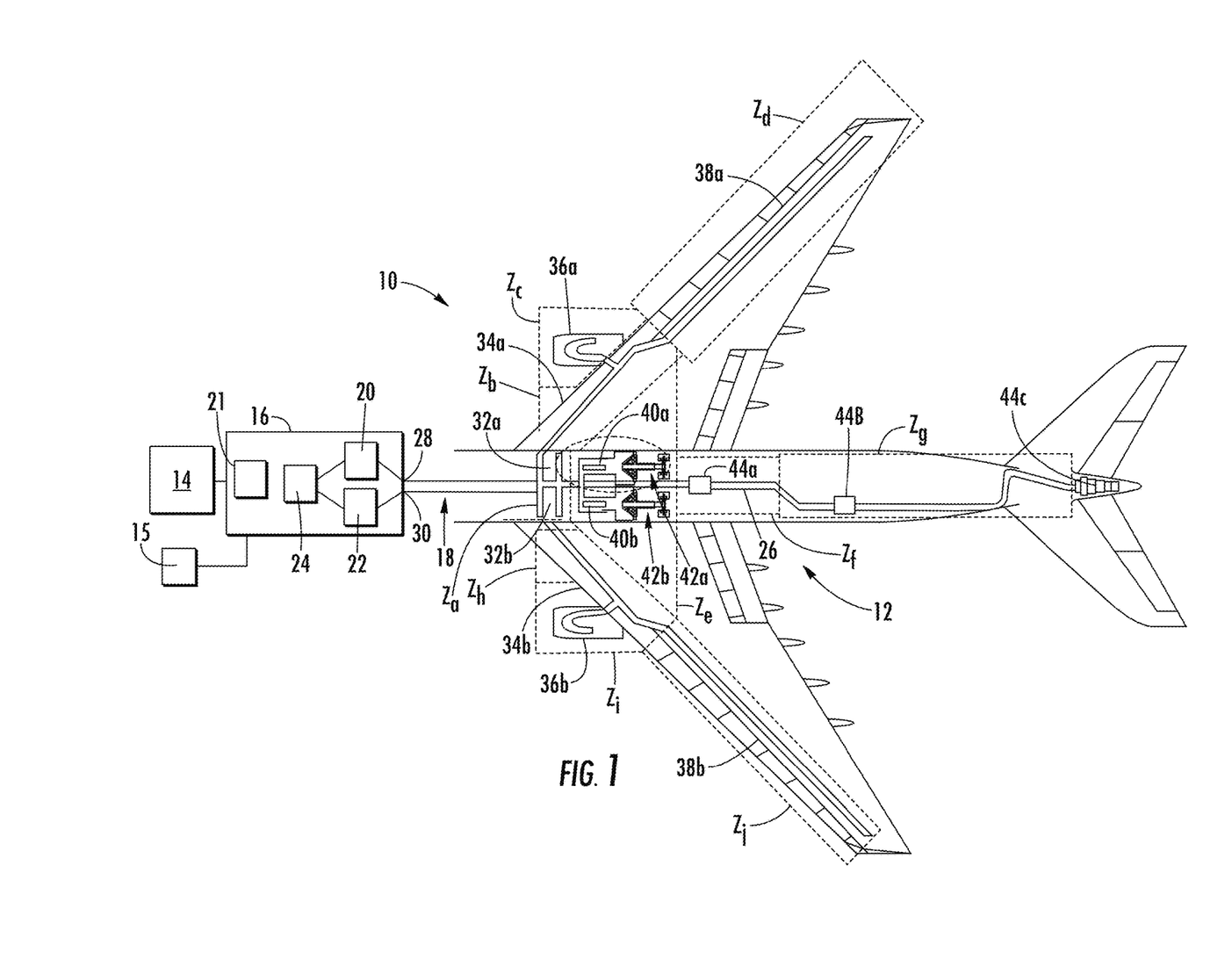
FIG. 1 is a schematic view of an overheat and overstrain detection system architecture for monitoring all zones, according to an embodiment of the present disclosure.

FIG. 1 is a schematic view of a dual overheat and strain detection system 10 for an aircraft 12. The aircraft 12 includes zones $Z_a$-$Z_j$ and a flight warning system 14. The dual overheat and strain detection system 10 includes an optical controller 16 and one or more fiber optic loops 18. The optical controller 16 includes an optical transmitter 20, an optical receiver 22, a computer-readable memory 24, and a communication module 21 for communicating with the on board flight warning system 14 and central maintenance computer 15 typically via one or more aerospace data buses (e.g., CAN bus, ARINC429, etc.). The fiber optic loop 18 includes a first fiber optic cable 26. The first fiber optic cable 26 includes a first end 28 and a second end 30. The fiber optic loop 18 is connected to the optical controller 16 and extends between the optical transmitter 20 and the optical receiver 22. Both the first end 28 and the second end 30 of the first fiber optic cable 26 can be connected to the optical transmitter 20. Similarly, both the first end 28 and the second end 30 of the first fiber optic cable 26 can be connected to the optical receiver 22. It is understood, however, that in some examples only one of the first end 28 or the second end 30 is connected to the optical transmitter 20 and/or the optical receiver 22. The First fiber optic loop 18 may extend through one or more zones $Z_a$-$Z_j$ of the aircraft 12. The optical controller 16 is connected to the flight warning system 14 and other systems within the aircraft 12.

The optical controller 16 may be configured to control the optical transmitter 20 to control the transmission of an optical signal through the fiber optic loop 18. The optical controller 16 may also be configured to receive an optical signal from the optical receiver 22 and to analyze the optical signal received at the optical receiver 22. The optical controller 16 may include a microprocessor, microcontroller, application-specific integrated circuit (ASIC), digital signal processor (DSP), field programmable gate-array (FPGA) or any other circuit capable of controlling the optical transmitter 20 and receiving signals from the optical receiver 22. The optical controller 16 may include one or more computer-readable memory encoded with instructions that, when executed by the optical controller 16, cause the optical controller 16 and/or other elements of the dual overheat and strain detection system 10 to operate in accordance with techniques described herein. The optical controller 16 may further communicate with the flight warning system 14 to communicate temperature data to the flight warning system 14 using a wired or wireless connection. It is understood that all communications for the dual overheat and strain detection system 10 can be made using wired, wireless, or optical communications or some combination of these methods.

The computer-readable memory 24 of the optical controller 16 can be configured to store information within the optical controller 16 during and after operation. The computer-readable memory 24, in some examples, can be described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, the computer-readable memory 24 can include temporary memory, meaning that a primary purpose of the computer-readable memory is not long-term storage. The computer-readable memory 24, in some examples, can be described as a volatile memory, meaning that the computer-readable memory 24 does not maintain stored contents when electrical power to the optical controller 16 is removed. Examples of volatile memories can include random access memories (RAM), dynamic random access memories (DRAM), static random access memories (SRAM), and other forms of volatile memories. In some examples, the computer-readable memory 24 can be used to store program instructions for execution by one or more processors of the optical controller 16. For instance, the computer-readable memory 24 can be used by software or applications executed by the optical controller 16 to temporarily store information during program execution.

The optical controller 16 is connected to the optical transmitter 20 to control the transmission of an optical signal from the optical transmitter 20 to the fiber optic loop 18. The optical controller 16 is also connected to the optical receiver 22 to analyze the signals received by the optical receiver 22. The optical controller 16 receives information regarding the optical signal from the optical receiver 22. Variations in the optical signals analyzed by the optical controller 16 allows the optical controller 16 to determine the temperature and strain within zones $Z_a$-$Z_j$ and to determine the location that a temperature and a strain variation occurs in within zones $Z_a$-$Z_j$.

The optical transmitter 20 is controlled by the optical controller 16 and can be connected to the first end 28 of the first fiber optic cable 26, to the second end 30 of the first fiber optic cable 26, or to both. The optical transmitter 20 is configured to provide an optical signal to the first end 28 or the second end 30 of the first fiber optic cable 26. The optical transmitter 20 may be any suitable optical source for providing an optical signal to the first fiber optic cable 26. For example, the optical transmitter may be a light-emitting diode or a laser. It is further understood that the optical transmitter 20 may be configured to provide the optical signal in any suitable manner, such as through a single pulse at a fixed wavelength; a tunable swept-wavelength; a broadband signal; and a tunable pulse. Furthermore, while the optical controller 16 is described as including the optical transmitter 20, it is understood that the optical controller 16 may include one or more optical transmitters 20 to provide optical signals to the first fiber optic cable 26.

The optical receiver 22 is configured to receive the optical signal from either the first end 28 or the second end 30 of the first fiber optic cable 26. Where the optical transmitter 20 provides the optical signal through the first end 28, a first portion of the optical signal travels through the first fiber optic cable 26 and is received by the optical receiver 22 at the second end 30. A second portion of the optical signal can be reflected back to the first end 28 and received by the optical receiver 22. The optical receiver 22 communicates information regarding the first portion of the optical signal, the second portion of the optical signal, or both to the optical controller 16. The optical receiver 22 may be any suitable receiver for receiving an optical signal. For example, the optical receiver 22 may be a photodiode, a photodiode array, a phototransistor, or any other suitable optical receiving device.

Fiber optic loop 18 may include a single, continuous fiber optic loop extending through one or more zones $Z_a$-$Z_j$ in the aircraft 12. Zones $Z_a$-$Z_j$ may include any location on the aircraft 12 where overheat detection or strain detection is desired. For example, zones $Z_a$-$Z_j$ may include bleed air ducts, cross-over bleed air ducts, landing gear 42a, 42b, wing boxes, Air Conditioning (A/C) packs, anti-icing systems, nitrogen generation systems, or any other area where temperature sensing or strain sensing is desirable. Zones $Z_a$-$Z_j$ may be divided and assigned in any desired manner. In the illustrated example, zone $Z_a$ includes a right side cross-over bleed air duct 32a and a left side cross-over bleed air duct 32b; zone $Z_b$ includes protection for the right side of the wing box 34a; zone $Z_c$ includes a right pylon 36a; zone $Z_d$ includes a right wing ice protection system 38a; zone $Z_e$ includes a right A/C pack 40a, a left A/C pack 40b, the right landing gear 42a, and the left landing gear 42b; zone $Z_f$ includes a first APU 44a; zone $Z_g$ includes a second APU 44b and a third APU 44c, zone $Z_h$ includes a left wing box 34b; zone $Z_i$ includes a left pylon 36b; and zone $Z_j$ includes a left wing ice protection system 38b. While the aircraft 12 is described as including ten zones, it is understood that the aircraft 12 may be divided into as many or as few zones as desired.

The aircraft 12 may be divided into zones in any desired manner; for example, the aircraft 12 may be divided into zones based on the overheat temperature or overstrain for the components located in that zone or based on system type. Each zone $Z_a$-$Z_j$ of aircraft may have a different alarm set point (i.e., threshold temperature value), such that where the temperature in zone $Z_a$ is the same as the temperature in zone $Z_b$ an overheat alarm may be triggered for zone $Z_b$ but not for zone $Z_a$. Each zone $Z_a$-$Z_j$ of aircraft may have a different alarm set point (i.e., threshold strain value), such that where the strain in zone $Z_a$ is the same as the strain in zone $Z_b$ an alarm may be triggered for zone $Z_b$ but not for zone $Z_a$.

The fiber optic loop 18 may be a continuous fiber optic loop that passes through one or more zones $Z_a$-$Z_j$ of the aircraft 12 to provide temperature and/or strain sensing across one or more zones $Z_a$-$Z_j$. The fiber optic loop 18 is connected to the optical controller 16, and the optical controller 16 is configured to determine the occurrence of an overheat event or overstrain event, the zone in which the overheat event has occurred in, and whether the overheat event is at or above the alarm set point for that zone. The optical controller 16 thus knows the length and alarm set point (e.g., a threshold temperature value or threshold strain value) of the fiber optic loop 18 in each zone $Z_a$-$Z_j$ and the order in which the fiber optic loop 18 passes through each zone $Z_a$-$Z_j$. While the dual overheat and strain detection system 10 is described as including the fiber optic loop 18, the dual overheat and strain detection system 10 may include any desired number of fiber optic loops passing through each zone $Z_a$-$Z_j$. For example, the dual overheat and strain detection system 10 may include a second fiber optic loop connected to the optical controller 16 such that an overheat condition is triggered only when both the first fiber optic loop 18 and the second fiber optic loop go into an alarm condition within a specified time period. Moreover, while the fiber optic loop 18 is described as including the first fiber optic cable 26 in a loop configuration, it is understood that the first fiber optic cable 26 can be disposed in a single-ended configuration such that only one of the first end 28 and the second end 30 is connected to the optical controller 16. For example, in the single-ended configuration where the first end 28 is connected to the optical controller 16, the optical controller 16 can provide an optical signal to the first end 28 of the first fiber optic cable 26 and can interpret the optical response signal that is reflected back to the optical controller 16 through the first end 28.

The optical controller 16 analyzes the information provided by the optical signal using the techniques discussed herein to determine the temperature in each zone $Z_a$-$Z_j$, the strain in each zone $Z_a$-$Z_j$, or both. The temperature and/or the strain may be determined at discrete locations within each zone $Z_a$-$Z_j$, such as, for example, on specific components (e.g., the landing gear 42a, 42b). Where the optical controller 16 determines that the temperature or strain within a zone is above the alarm set point (e.g., a threshold temperature value or threshold strain value) for that zone, the optical controller 16 generates an alarm signal that an overheat event or overstrain event has occurred. In addition to sensing the existence of an overheat event or overstrain event, monitoring the temperature and strain in each zone $Z_a$-$Z_j$ allows the dual overheat and strain detection system 10 to provide fire detection and overstrain detection for zones $Z_a$-$Z_j$. For example, a dramatic, sudden increase in temperature can indicate the existence of a fire or overheat event, and because the optical controller 16 monitors the actual temperature instead of merely whether or not an overheat event has occurred, the optical controller 16 can sense the dramatic, sudden increase in temperature and provide a fire or overheat detection warning to the cockpit, to a fire suppression system, or to any other location. In another example, a dramatic, sudden increase in strain can indicate excess fatigue or overstrain event, and because the optical controller 16 monitors the actual strain instead of merely whether or not an overstrain event has occurred, the optical controller 16 can sense the dramatic, sudden increase in strain and provide an overstrain or life reduction warning to the cockpit, to a maintenance system, or to any other location. In addition to monitoring rapid overheat events and over strain events the optical controller 16 can monitor for a rate of rise (i.e., trending) of heat and strain and then take action based upon the rate of rise. For example, strain may slowly increase over time at a particular rate and then the optical controller 16 may determine a maintenance need based on the rate of the increase of strain over time, which advantageously, would help reduced unscheduled maintenance.

The dual overheat and strain detection system 10 can sense a temperature or strain at any location or at multiple locations along the first fiber optic cable 26. Because the temperature can be sensed at any location or multiple locations along the first fiber optic cable 26, a temperature profile may be developed for the entire length of the first fiber optic cable 26, and as such, a temperature profile may be developed for each zone $Z_a$-$Z_j$. Because the strain can be sensed at any location or multiple locations along the first fiber optic cable 26, a strain profile may be developed for the entire length of the first fiber optic cable 26, and as such, a strain profile may be developed for each zone $Z_a$-$Z_j$. The dual overheat and strain detection system 10 can further provide locational information regarding the exact location within each zone $Z_a$-$Z_j$ that an event occurs at. The temperature profile for each zone $Z_a$-$Z_j$ can then be compared to a maximum allowable temperature profile, which can include a single temperature for an entire zone $Z_a$-$Z_j$ or multiple temperatures at varying locations in each zone $Z_a$-$Z_j$. As such, it is understood that the optical controller 16 can determine any desired temperature data for any zone $Z_a$-$Z_j$, and the temperature data can include a single temperature at a single location within a zone, temperatures at multiple locations throughout a zone, a temperature profile for a zone, or determining and developing any other desired temperature data for the zone. The strain profile for each zone $Z_a$-$Z_j$ can then be compared to a maximum allowable strain profile, which can include a single strain for an entire zone $Z_a$-$Z_j$ or multiple temperatures at varying locations in each zone $Z_a$-$Z_j$. As such, it is understood that the optical controller 16 can determine any desired strain data for any zone $Z_a$-$Z_j$, and the strain data can include a single strain at a single location within a zone, strains at multiple locations throughout a zone, a strain profile for a zone, or determining and developing any other desired strain data for the zone.

The optical controller 16 can also generate trend data to allow for health monitoring of the aircraft 12. The trend data may include data regarding temperature trends, strain trends, or both. The trend data can be stored in memory 24 of the optical controller 16 or in any other suitable storage medium at any other suitable location, such as the memory of the flight warning system 14. It is understood that the data can be monitored in real time. For example, the optical controller 16 may communicate with a dedicated health monitoring system to monitor the temperature data and strain data in real time. The stored trend data provides statistical and historical data for the temperature, strain, or both experienced in all zones $Z_a$-$Z_j$. The temperature and strain trend data may be stored and monitored by maintenance personnel. As such, the temperature and/or strain trend data allows maintenance personnel to determine the exact location of progressive temperature and/or strain increases over time. It is further understood that the optical controller 16 can generate the exact location of a one-time temperature variation, strain variation, or both. Generating the locations of progressive temperature and/or strain increases allows for preventative, targeted maintenance before a failure occurs. For example, the temperature trend in a right landing gear 42a may be monitored to generate trend data. The trend data may show that a brake system of the right landing gear 42a exceeds the normal operating temperatures without reaching the alarm set point. In such a case an overheat event does not occur; however, the temperature trend data informs maintenance personal that the tire may be close to failing or that the tire may be low on air pressure and that a maintenance action is required. In another example, the temperature trend in the right side cross-over bleed duct 32a and/or the left side cross-over bleed air duct 32b may be monitored to generate trend data simultaneously to the trend data of the right landing gear 42a and/or the left landing gear 42b. Similar to temperature monitoring, the strain trend data may be stored and areas of increased strain may be located. For example, the pressure of the bleed air passing through right side cross-over bleed duct 32a may impart a strain on the wall of right side cross-over bleed duct 32a. In another example, the stress of repetitive take-off and landings of the aircraft 12 on the landing gear 42a, 42b may impart a strain on a main support structure of the landing gear 42a, 42b. The level of the strain and the location of the strain may be detected by the optical controller 16 analyzing the information received from the optical signals. The strain information may then be communicated to ground personnel and used to investigate the location of the increased strain to determine any maintenance action that should be taken.

The optical controller 16 is connected to the flight warning system 14 to communicate information to the flight warning system 14. While the optical controller 16 is described as communicating with the flight warning system 14, the optical controller 16 may communicate with the aircraft 12 and with maintenance personnel in any suitable manner. The optical controller 16 may also communicate directly with a cockpit of the aircraft 12 to provide overheat or fire detection warning, or to indicate that maintenance is necessary. The optical controller 16 may further communicate temperature data and strain data to other non-dual overheat and strain detection system computers, which may communicate an overheat status and overstrain status to the cockpit. The aircraft 12 may also include a central dual overheat and strain detection system computer that communicates with various dual overheat and strain detection systems on aircraft, and the central dual overheat and strain detection system computer may communicate any overheat status from any dual overheat and strain detection system to the cockpit. It is understood that all communications for the dual overheat and strain detection system 10 can be made using wired, wireless, or optical communications or some combination of these methods.

Figure 2A:
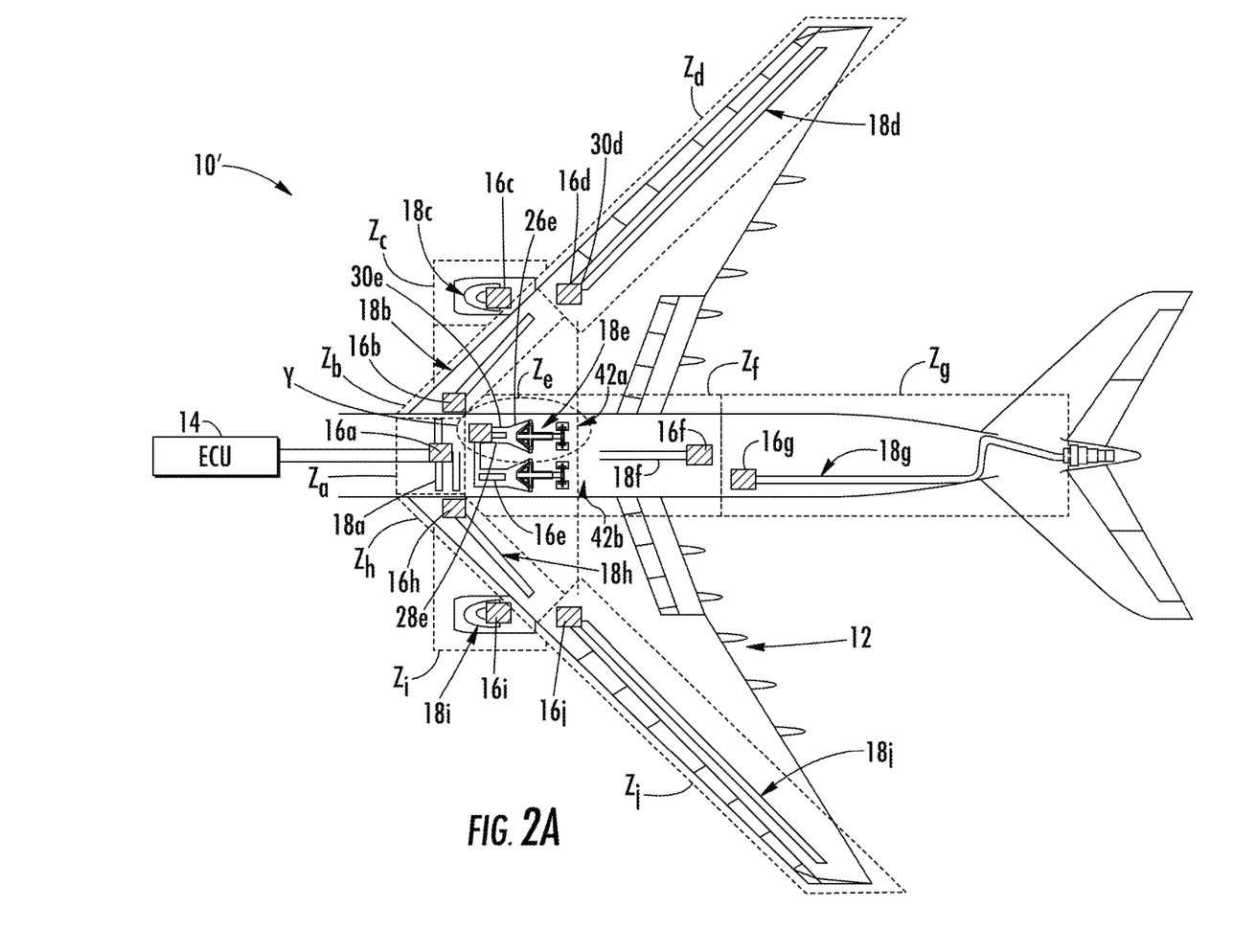
FIG. 2A is a schematic view of an overheat and overstrain detection system architecture for monitoring individual zones, according to an embodiment of the present disclosure.

FIG. 2A is a schematic diagram of the dual overheat and strain detection system 10' for the aircraft 12. The aircraft 12 includes zones $Z_a$-$Z_j$ and the flight warning system 14. The dual overheat and strain detection system 10' includes optical controllers 16a-16j and fiber optic loops 18a-18j. Zones $Z_a$-$Z_j$ extend through any portion of the aircraft 12 where temperature monitoring, strain monitoring, or both are desirable.

In the dual overheat and strain detection system 10', each of the optical controllers 16a-16j and the fiber optic loops 18a-18j is dedicated to a single zone $Z_a$-$Z_j$. As such, each of the optical controllers 16a-16j and the fiber optic loops 18a-18j monitors and gathers temperature and strain information from a single zone $Z_a$-$Z_j$. Each of the optical controller 16a-16j includes an optical transmitter (discussed in detail below in FIGS. 2B-2D) and an optical receiver (discussed in detail below in FIGS. 2B-2D).

All zones $Z_a$-$Z_j$ can have a unique alarm set point, and each zone $Z_a$-$Z_j$ can include any location or combination of locations on the aircraft 12 where temperature and strain monitoring and detection are desired. For example, zones $Z_a$-$Z_j$ may include bleed air ducts, cross-over bleed air ducts, landing gear 42a, 42b, wing boxes, A/C packs, anti-icing systems, nitrogen generation systems, or any other area where temperature sensing is desirable. While the aircraft 12 is described as including ten zones, it is understood that the aircraft 12 may be divided into as many or as few zones as desired.

The fiber optic loop 18e is illustrated as including the first fiber optic cable 26e, and the first fiber optic cable 26e includes the first end 28e and the second end 30e. It is understood, that while the fiber optic loop 18e is illustrated as including the first fiber optic cable 26e, each of the fiber optic loop 18a-18j can include one or more fiber optic cables. In addition, each fiber optic cable can include a first end and a second end connected to controllers 16a-16j. Overheat and overstrain detection across each of zones $Z_a$-$Z_j$ is substantially similar, and for ease of discussion, zone $Z_e$ will be discussed in further detail. The optical controller 16e controls the transmission of an optical signal from the optical transmitter through the fiber optic loop 18e. The optical signal may be provided to the first fiber optic cable 26e through the first end 28e, the second end 30e or both. Where the optical signal is provided through the first end 28e, a first, majority portion of the optical signal passes through the first fiber optic cable 26e, to the second end 30e, and is received by the optical receiver at the second end 30e. A second, minority portion of the fiber optic signal is backscattered within the first fiber optic cable 26e and received at the first end 28e by the optical receiver. While the optical controller 16e is described as including a single optical receiver, it is understood that the optical controller 16e may include multiple optical receivers to receive the optical signal from different fiber optic loops, different fiber optic cables, and/or different ends of the fiber optic cables. The optical controller 16e receives optical signal data regarding both the first, majority portion and the second, minority portion of the optical signal. The optical controller 16e analyzes the optical signal data to determine the temperature, strain, or both within zone $Z_e$. Moreover, while the optical controller 16e is described as receiving both the first portion and the second portion of the optical signal, it is understood that in some examples the first end 28e is connected to the optical controller 16e while the second end 30e remains disconnected, such that the first fiber optic cable 26e is in a single-ended configuration. Where the first fiber optic cable 26e is in a single-ended configuration, the optical controller 16e can receive relevant information from the backscattered portion of the optical signal.

Figure 2B:
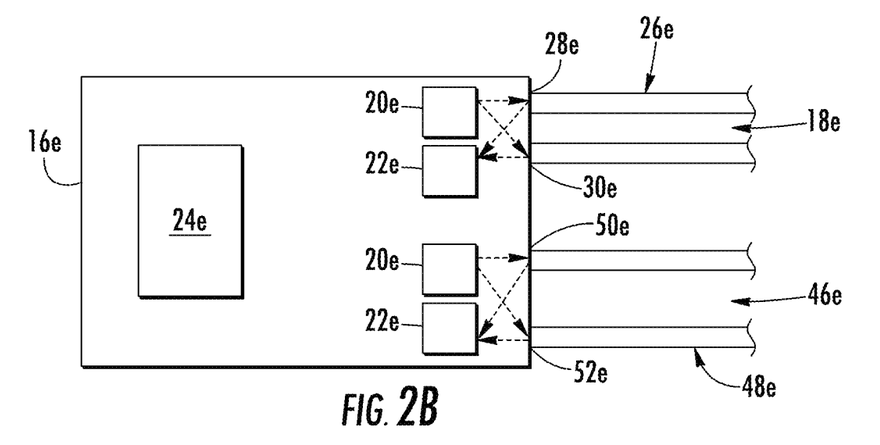
FIG. 2B is an enlarged view of a first embodiment of detail Y in FIG. 2A including a dual loop configuration, according to an embodiment of the present disclosure.

FIG. 2B is an enlarged view of detail Y in FIG. 2A, showing a dual loop configuration. FIG. 2B includes the optical controller 16e, the first fiber optic loop 18e, second fiber optic loop 46e, optical transmitters 20e, optical receivers 22e, and the computer-readable memory 24e. The first fiber optic loop 18e includes the first fiber optic cable 26e, and the first fiber optic cable 26e includes the first end 28e and the second end 30e. Second fiber optic loop 46e includes second fiber optic cable 48e, and second fiber optic cable 48e includes first end 50e and second end 52e.

The first fiber optic loop 18e extends from the optical controller 16e through zone $Z_e$ (best seen in FIG. 2A). The first fiber optic loop 18e includes the first fiber optic cable 26e, and the first fiber optic cable 26e is configured to receive a first optical signal from the optical transmitter 20e. The optical receiver 22e is configured to receive the first optical signal from the first fiber optic cable 26e. The optical receiver 22e provides information regarding the resultant optical signal to the optical controller 16e. The optical controller 16e analyzes the information to generate temperature information, strain information, or both.

Similar to the first fiber optic loop 18e, second fiber optic loop 46e extends through zone $Z_e$. Second fiber optic loop 46e runs parallel to the first fiber optic loop 18e through zone $Z_e$. Second fiber optic cable receives a second optical signal from the optical transmitter 20e. The optical receiver 22e receives the second optical signal from second fiber optic cable 48e, and the optical receiver 22e provides information regarding the received second optical signal to the optical controller 16e. The optical controller 16e analyzes the information to generate temperature information, strain information, or both.

While the first fiber optic loop 18e and second fiber optic loop 46e are illustrated as receiving an optical signal from discrete optical transmitters 20e, it is understood that a single optical transmitter may provide the same optical signal to both the first fiber optic loop 18e and second fiber optic loop 46e.

The first fiber optic loop 18e and second fiber optic loop 46e run parallel through zone $Z_e$. The first fiber optic loop 18e and second fiber optic loop 46e extend through zone $Z_e$ in a dual loop configuration. In the dual loop configuration, the optical signal provided to second fiber optic cable 48e is preferably identical to the optical signal provided to the first fiber optic cable 26e. Providing the same optical signal to both the first fiber optic cable 26e and second fiber optic cable 48e allows the optical controller 16e to compare the resultant signal obtained from the first fiber optic cable 26e to the resultant signal obtained from second fiber optic cable 48e, thereby providing a greater degree of confidence in both the first fiber optic loop 18e and second fiber optic loop 46e. As such, the optical signals passing through the first fiber optic loop 18e and second fiber optic loop 46e provide data regarding the same changes in temperature and strain at the same locations throughout the first fiber optic loop 18e and second fiber optic loop 46e. Both the first fiber optic cable 26e and second fiber optic cable 48e communicate the information regarding the resultant optical signals to the optical controller 16e.

In a single loop configuration, a single fiber optic loop passes through each zone, and an overheat event or overstrain event is indicated when the optical controller 16e detects an alarm state in the single fiber optic loop. In a dual loop configuration, a first fiber optic loop passes through a zone and a second fiber optic loop passes through the zone running parallel to the first fiber optic loop. An overheat event or overstrain event is detected when both the first fiber optic loop and the second fiber optic loop sense the same overheat event or overstrain event within a specified time duration. The first fiber optic cable 26e and second fiber optic cable 48e have the same alarm set point in the same zone. An overheat event or overstrain event is detected when both the first fiber optic cable 26e and second fiber optic cable 48e sense the overheat event or overstrain event within a specified time duration. As such, the optical controller 16e triggers an overheat or overstrain alarm only when both the first fiber optic cable 26e and second fiber optic cable 48e sense the overheat event or overstrain event in zone $Z_e$, within a predetermined time period. In this way, the dual loop configuration ensures that overheat events or overstrain events are detected with high reliability. While a dual loop configuration is described as extending through zone $Z_e$, it is understood that a dual loop configuration may pass through any zone $Z_a$-$Z_j$ and be received by any the optical controller 16a-16j.

Figure 2C:
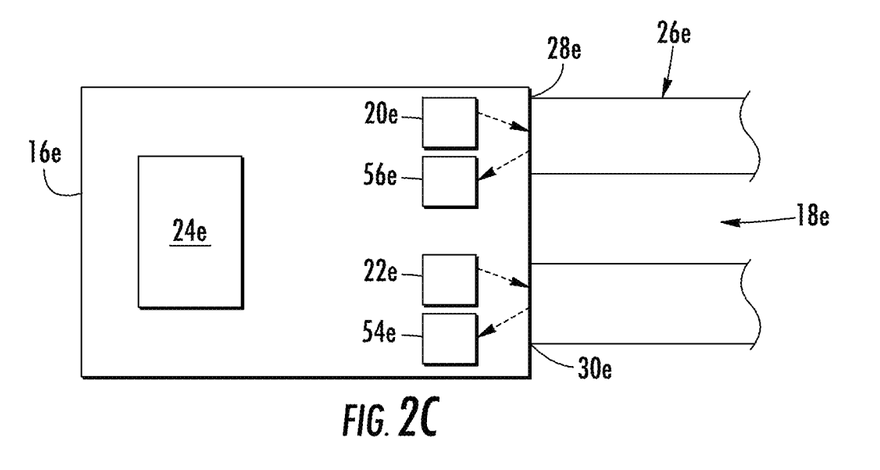
FIG. 2C is an enlarged view of a second embodiment of detail Y in FIG. 2A including a probe configuration, according to an embodiment of the present disclosure.

FIG. 2C is an enlarged view of detail Y of FIG. 2A, showing the optical controller 16e including a probe signal configuration. In a probe signal configuration, an optical signal is provided to a first end of a fiber optic cable and a probe signal is provided to a second end of the fiber optic cable. For example, the optical signal may be a pulsed signal and the probe signal may be a continuous wave. The optical signal interacts with the probe signal as the optical signal and the probe signal pass within the fiber optic cable. The interaction between the optical signal and the probe signal provides information regarding the temperature, the strain, or both along the length of the fiber optic cable. FIG. 2C includes the optical controller 16e, the fiber optic loop 18e, the optical transmitter 20e, the optical receiver 22e, the computer-readable memory 24e, a redundant transmitter 54e, and probe receiver 56e. The fiber optic loop 18e includes the first fiber optic cable 26e, and the first fiber optic cable 26e includes the first end 28e and the second end 30e.

The fiber optic loop 18e extends through zone $Z_e$ (best seen in FIG. 2A). The first end 28e of the first fiber optic cable 26e is connected to the optical controller 16e and configured to receive an optical signal from the optical transmitter 20e. The second end 30e of the first fiber optic cable 26e is connected to the optical controller 16e and is configured to receive a probe signal from the redundant transmitter 54e. The optical controller 16e controls both the optical transmitter 20e and the redundant transmitter 54e.

The optical transmitter 20e provides an optical signal to the first end 28e of the first fiber optic cable 26e. The redundant transmitter 54e may provide a probe signal to the second end 30e of the first fiber optic cable 26e alternating with the optical transmitter 20e. For example, one of the optical signal and the probe signal may be a pulsed signal and the other one of the optical signal and the probe signal may be a continuous wave. The optical signal and the probe signal interact as the optical signal passes the probe signal in the first fiber optic cable 26e. A frequency difference between the optical signal and the probe signal is received by the optical receiver 22e, probe receiver 56e, or both. The optical controller 16e monitors the interaction between the optical signal and the probe signal, as the interaction between the optical signal and the probe signal changes as the temperature and strain change within zone $Z_e$. As such, the optical controller 16e monitors the interaction to determine the temperature, strain, or both along the first fiber optic cable 26e. While the optical controller 16e is described as including the optical transmitter 20e and the redundant transmitter 54e, it is understood that any the optical controller 16a-16j may include an optical transmitter and a probe transmitter to provide an optical signal and a probe signal to first fiber optic cables 26a-26j (best seen in FIG. 2A).

Figure 2D:
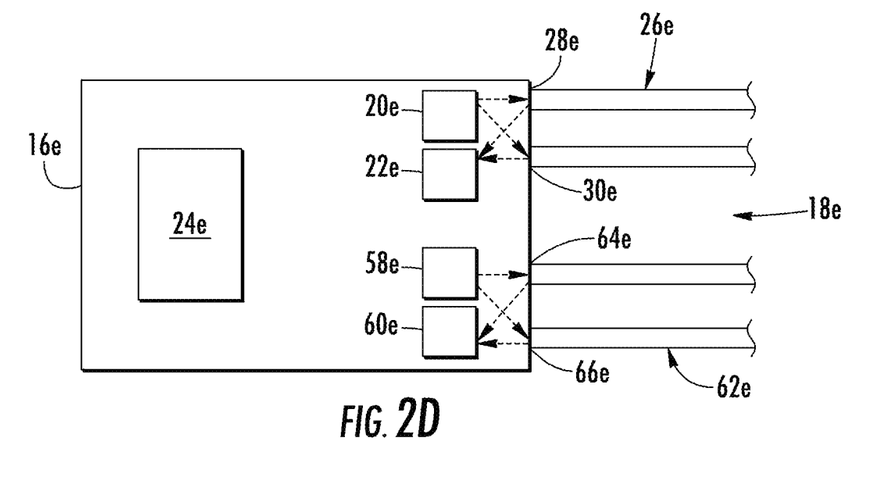
FIG. 2D is an enlarged view of a third embodiment of detail Y in FIG. 2A including a reference configuration, according to an embodiment of the present disclosure.

FIG. 2D is an enlarged view of detail Y of FIG. 2A, showing the optical controller 16e in a reference configuration. In the reference configuration, an optical signal is provided to a first fiber optic cable and a reference signal is provided to a reference fiber optic cable, which runs parallel to the first fiber optic cable. The optical signal and the reference signal are both received at an optical controller and combined. The interaction of the optical signal with the reference signal creates an interference pattern, which can then be analyzed to obtain temperature data, strain data, or both. FIG. 2D includes the optical controller 16e, the fiber optic loop 18e, the optical transmitter 20e, the optical receiver 22e, the computer-readable memory 24e, reference transmitter 58e, and reference receiver 60e. The fiber optic loop 18e includes the first fiber optic cable 26e and reference fiber optic cable 62e. The first fiber optic cable 26e includes the first end 28e and the second end 30e. Similarly, reference fiber optic cable 62e includes first end 64e and second end 66e.

The fiber optic loop 18e extends through zone $Z_e$ (best seen in FIG. 2A). The first fiber optic cable 26e and reference fiber optic cable 62e run parallel through zone $Z_e$. The first end 28e of the first fiber optic cable 26e is connected to the optical controller 16e and configured to receive an optical signal from the optical transmitter 20e. Similarly, first end 64e of reference fiber optic cable 62e is connected to the optical controller 16e and configured to receive a reference signal from reference transmitter 58e. While the first fiber optic cable 26e is described as receiving an optical signal from the optical transmitter 20e and reference fiber optic cable 62e is described as receiving a reference signal from reference transmitter 58e, it is understood that a single optical transmitter may provide both the optical signal to the first fiber optic cable 26e and the reference signal to reference fiber optic cable 62e.

The second end 30e of the first fiber optic cable 26e is connected to the optical controller 16e to provide the optical signal to the optical receiver 22e. Similarly, second end 66e of reference fiber optic cable 62e is connected to the optical controller 16e to provide the reference signal to reference receiver 60e. It is understood that while the second end 30e of the first fiber optic cable 26e provides the optical signal to the optical receiver 22e, a second optical receiver may be connected to the first end 28e to receive any backscattering of the optical signal through the first end 28e. Similarly, a second reference receiver may receive any backscattering of reference signal through first end 64e of reference fiber optic cable 62e.

The optical controller 16e receives both the optical signal and the reference signal and combines the optical signal and the reference signal to generate an interference pattern. The optical controller 16e analyzes the combined optical signal and reference signal to determine temperature changes, strain changes, or both along the fiber optic loop 18e. It is understood that the optical controller 16e can combine the optical signal received at the second end 30e with the reference signal received at second end 66e, or can combine the backscattered optical signal received at first end 30e with the backscattered reference signal received at first end 64e. While the fiber optic loop 18e is described as including the first fiber optic cable 26e and reference fiber optic cable 62e, it is understood that any the fiber optic loop 18a-18j may include a first fiber optic cable and a reference fiber optic cable. As such, any the optical controller 16a-16j may be configured to combine and analyze an optical signal and a reference signal.

Figure 3:
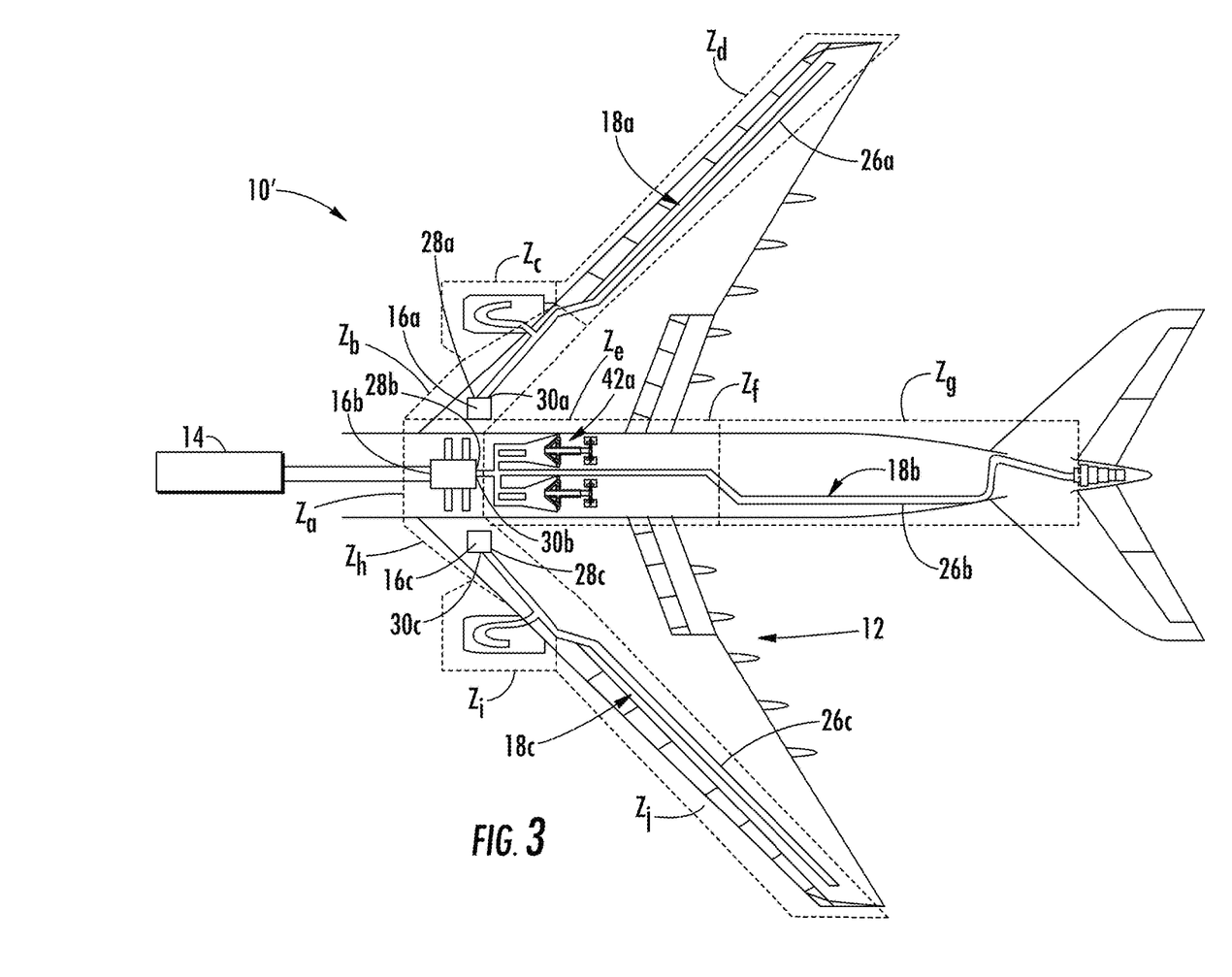
FIG. 3 is a schematic view of an overheat detection system architecture for monitoring multiple zones, according to an embodiment of the present disclosure.

FIG. 3 is a schematic diagram of the dual overheat and strain detection system 10" for the aircraft 12. The aircraft 12 includes zones $Z_a$-$Z_j$ and the flight warning system 14. The dual overheat and strain detection system 10" includes optical controllers 16a-16c and fiber optic loops 18a-18c. Fiber optic loops 18a-18c include first fiber optic cables 26a-26c, and first fiber optic cables 26a-26c include first ends 28a-28c and second ends 30a-30c.

In the dual overheat and strain detection system 10" the fiber optic loop 18 a passes through zones $Z_b$-$Z_d$, and the fiber optic loop 18a is connected to the optical controller 16a. The fiber optic loop 18b passes through zones $Z_a$ and $Z_e$-$Z_g$ and the fiber optic loop 18b is connected to the optical controller 16b. The fiber optic loop 18c passes through zones $Z_h$-$Z_j$, and the fiber optic loop 18c is connected to the optical controller 16c. As such, each of the fiber optic loop 18a-18c passes through and gathers information regarding multiple zones of the aircraft 12.

Different systems within the aircraft 12 require overheat detection monitoring, and each system may be divided into multiple zones. For example, a bleed air duct in the aircraft 12 may include multiple zones with a single fiber optic loop extending through one or more of the zones of the bleed air duct. Each system may thus be divided into multiple zones and may include a dedicated optical controller and fiber optic loop. It is understood, however, that the aircraft 12 may be divided into zones in any desired manner.

Optical controllers 16a-16c can communicate with the flight warning system 14, and the flight warning system 14 can consolidate the information received from optical controllers 16a-16c and provide the information to the cockpit, provide the information to maintenance personnel, or store the information to generate trend data. While optical controllers 16a-16c are described as communicating with the flight warning system 14, it is understood that optical controllers 16a-16c can communicate directly with the cockpit or ground personnel, can store the information to generate trend data, and can communicate with a central overheat computer. It is understood that all communications for the dual overheat and strain detection system 10 can be made using wired, wireless, or optical communications or some combination of these methods.

Fiber optic loops 18a-18c are similar, and for purposes of clarity and ease of discussion, the fiber optic loop 18a will be discussed in further detail. The fiber optic loop 18a passes through each of zones $Z_b$-$Z_d$ and is connected to the optical controller 16a. The first fiber optic cable 26a receives an optical signal from the optical transmitter 20a located within the optical controller 16a and transmits the optical signal to the optical receiver 22 a located within the optical controller 16a. The optical controller 16a analyzes the signal received by the optical receiver 22 a to determine the temperature and/or strain in zones $Z_b$-$Z_d$. Each zone $Z_b$-$Z_d$ may have a different alarm set point as the temperature and/or strain resistance of each zone may differ. As such, the optical controller 16a analyzes the information received to determine the temperature and/or strain in each zone. In addition to determining temperature and/or strain in zones $Z_b$-$Z_d$, the optical controller 16a can analyze the information received from the first fiber optic cable 26a to determine the strain experienced in each zone $Z_b$-$Z_d$. The optical controller 16a can thus monitor temperature, strain, or both within zones $Z_b$-$Z_d$. While the fiber optic loop 18a is described as including first fiber optic cables 26a in a loop configuration, it is understood that the first fiber optic cable 26a can be disposed in a single-ended configuration such that only one of the first end 28a and the second end 30a is connected to the optical controller 16a. For example, in the single-ended configuration where the first end 28a is connected to the optical controller 16a, the optical controller 16a can provide an optical signal to the first end 28a of the first fiber optic cable 26a and can interpret the signal that is reflected back through the first end 28a.

Figure 4:
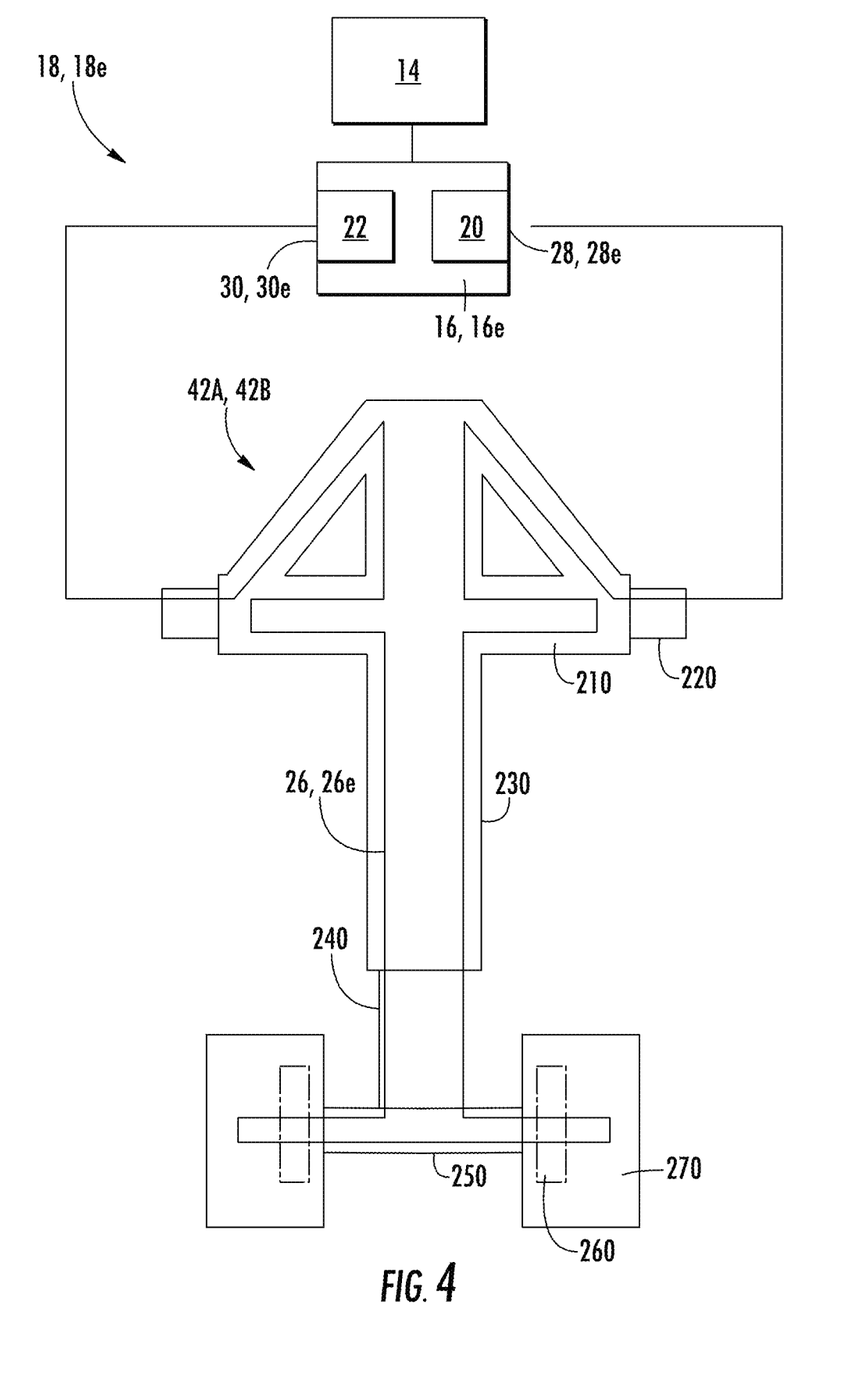
FIG. 4 is a schematic view of an overheat detection system architecture for monitoring a landing gear of an aircraft, according to an embodiment of the present disclosure.

Referring now to FIG. 4, with continued reference to FIGS. 1-3, a landing gear 42a, 42b is illustrated, in accordance with an embodiment of the present disclosure. The landing gear 42a, 42b may be either the right landing gear 42a or the left landing gear 42b illustrated in FIGS. 1-3. It is understood that the landing gear 42a, 42b illustrated in FIG. 4 is exemplarily in nature and embodiments disclosed herein may be applicable to any landing gear known to one of skill in the art.

As illustrated in FIG. 4, the landing gear 42a, 42b comprises a main support structure (i.e., trunnion) 210. The main support structure 210 may include or be operably connected to support arms 220 to operably connect the landing gear 42a, 42b to the aircraft 12. The main support structure 210 may include a cylinder 230 that operably connects to a piston 240. Internal to the cylinder 230 is a biasing mechanism, such as, for example, a hydraulic system, that allows the piston 240 to slide in and out of the cylinder 320 to absorb force upon take-off and landings of the aircraft 12. The piston 240 may be attached to a wheel axle 250 and wheels 270 may be attached to the wheel axle 250. A brake system 260 may be operably connected to the wheels 270. It is understood that the landing gear 42a, 42b illustrated in FIG. 4 is exemplarily in nature and embodiments disclosed herein may be applicable to a landing gear having more, less, and/or different components than illustrated in FIG. 4.

Also shown in FIG. 4, is the dual overheat and strain detection system 10, 10', 10" may be located in an outer tube, such as, for example, a flexible spiral metallic tube or semi-rigid metallic tube. The outer tube is not shown for simplicity. The outer tube may be attached to the landing gear 42a, 42b via fasteners, such as, for example metallic clamps. The dual overheat and strain detection system 10, 10', 10" includes the flight warning system 14 and the optical controller 16, 16e controls the transmission of an optical signal from the optical transmitter through the fiber optic loop 18, 18e. The fiber optic loops 18a, 18e include a fiber optic cables 26, 26e and the fiber optic cables 26, 26e include first end 28, 28e and second end 30, 30e. It is understood that the routing of the fiber optic cables 26, 26e illustrated in FIG. 4 is exemplarily in nature and embodiments disclosed herein may be applicable to different routings of the fiber optic cables 26, 26e than illustrated in FIG. 4. For example, routing of the fiber optic cables 26, 26e may wrap 360 degrees around the landing gear 42a, 42b or vertically up and down the landing gear 42a, 42b multiple times.

Disposed periodically across the fiber optic loop 18, 18e are inscribed gratings (referred to alternately as Bragg gratings) that remove by reflection a specific wavelength, or band of wavelengths, from the light passing through the fiber optic loop 18, 18e. The optical transmitter 20 transmits light and an optical receiver 22 detects the reflected wavelengths of the reflected light. In one example, the inscribed gratings may be equidistantly spaced along the fiber optic loop 18, 18e. As the fiber optic loop 18, 18e heats up or cools down, the fiber optic loop 18, 18e expands or contracts according to known thermal expansion coefficients. The expansion and contraction of the fiber optic loop 18, 18e causes a corresponding alteration to the wavelength of the light reflected by the gratings. Thus, the optical controller 16, 16e can determine how much shift has occurred in the reflected wavelength based on a comparison between the wavelengths of light being detected by the optical receiver 22 and the expected wavelengths of the reflected light with no thermal expansion or contraction.

The shift in the reflected wavelength is then converted according to known Bragg grating principles into a temperature reading that provides the temperature along the fiber optic loop 18, 18e. The Bragg grating temperature conversion utilizes the known thermal expansion traits of the fiber optic loop 18, 18e and the known effect of the thermal expansion on the wavelength of the reflected light to generate the temperature reading based on the detected wavelength.

In locations of the landing gear 42a, 42b where strain is desired to be detected, the fiber optic loop 18, 18e is attached to the landing gear 42a, 42b without overstuffing or excess fiber length in the outer tube such that it can be strain may be easily detected. In locations of the landing gear 42a, 42b where temperature is desired to be detected, the fiber optic loop 18, 18e is overstuffed or manufactured with excess fiber length inside the outer tube, such that strain of the landing gear 42a, 42b does not interfere with the temperature being detected by stretching the fiber optic loop 18, 18e. Advantageously, strain on a landing gear 42a, 42b may be detected in the same fiber optic loop 18, 18e as the temperature of a landing gear 42a, 42b, therefor reducing the cost and weight by eliminating the need for two entirely separate systems that would have required two controllers and two separate fiber optic loops or other detection methods.

The fiber optic loop 18, 18e is typically utilized for one of two purposes. The first purpose is to measure the temperature of a landing gear 42a, 42b along, or through, the landing gear 42a, 42b. The second purpose is to measure the temperature of ambient air surrounding, or adjacent to, the landing gear 42a, 42b. The temperature of landing gear 42a, 42b has be conventionally measured by locating a temperature sensor (e.g., eutectic salt technology) within a landing gear wheel well of an aircraft 12 but not directly on the landing gear 42a, 42b itself. Advantageously, by locating a fiber optic cables 26, 26e directly on the landing gear 42a, 42b, overheat detection of the landing gear 42a, 42b may be detected faster than previous methods. For example, if the landing gear 42a, 42b or more specifically, the brake system 260 were to overheat while stowed in the main landing gear bay a fiber optic cables 26, 26e located directly on the brake system 260 or landing gear 42a, 42b would detect an overheat condition faster than a remote temperature sensor (e.g., eutectic salt technology) located within the landing gear wheel well bay ceiling of the aircraft 12. Additionally, the direct installation permits additional area coverage over the remote ceiling mount installation.

Figure 5:
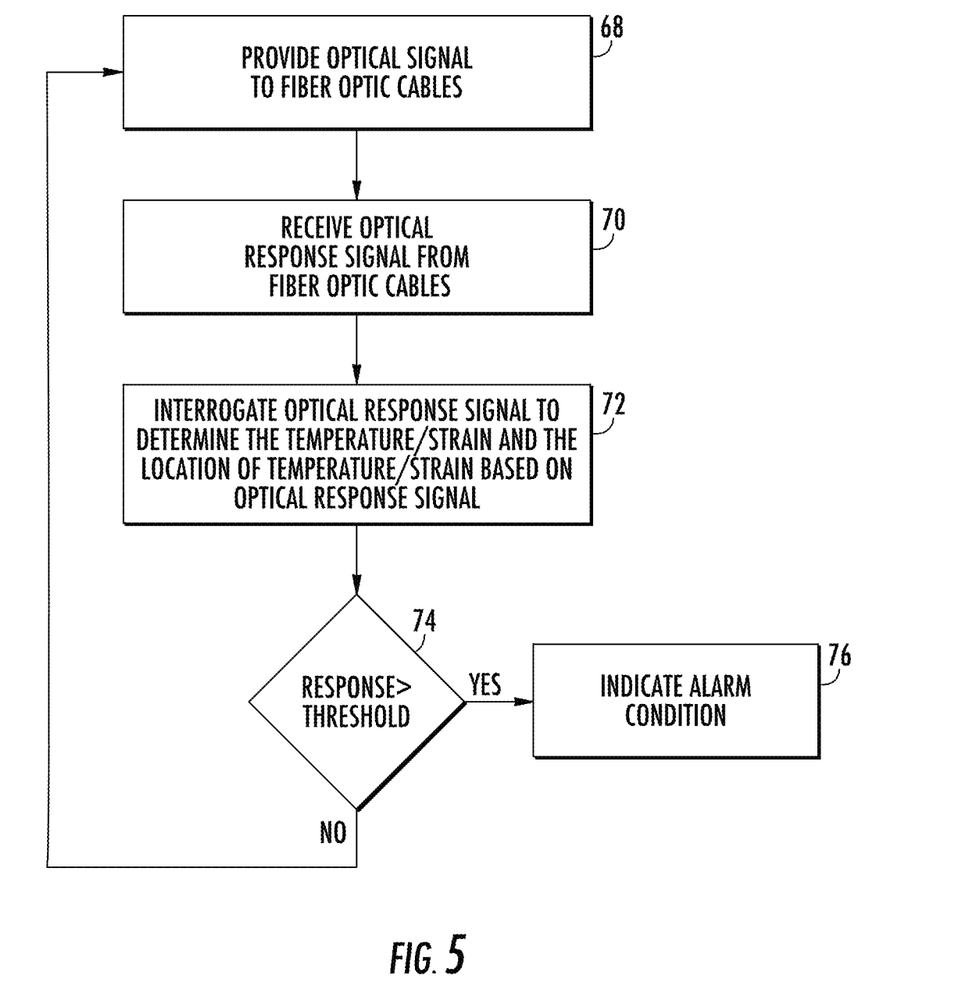
FIG. 5 is a flow diagram depicting an overheat and overstrain detection process, according to an embodiment of the present disclosure.

Referring now to FIG. 5, with continued references to FIGS. 1-4, a flow diagram illustrating a method to provide overheat detection and strain detection in an aircraft, or more specifically the landing gear 42a, 42b, utilizing optical signals is illustrated in accordance with an embodiment of the present disclosure. In step 68, an optical signal is provided to one or more fiber optic cables. For example, the optical transmitter 20 can provide an optical signal to the first fiber optic cable 26 through the first end 28, the second end 30, or both of the first fiber optic cable 26. In step 70, an optical response signal is received from the fiber optic cable. For instance, the optical receiver 22 may receive the optical response signal from the first fiber optic cable 26, and the optical receiver 22 may provide the optical response signal to the optical controller 16. In step 72, the optical response signal is analyzed to determine the temperature, strain, or both along the fiber optic cable. For example, the optical controller 16 may analyze the optical response signal received from the optical receiver 22 to determine the actual temperature and/or strain at various locations along the first fiber optic cable 26. The optical controller 16 may use any suitable method to analyze the optical response, such as the methods discussed below. It is understood that the first fiber optic cable 26 may sense a temperature and/or strain at any location along the first fiber optic cable 26 and the optical signal can be interrogated to determine the precise location that a temperature change and/or strain occurs at. As such, the temperature data and/or strain data analyzed by the optical controller 16 may include information to determine a temperature and/or strain at a single location within a zone, a temperature and/or strain at multiple locations throughout a zone, a temperature profile and/or strain profile for a zone, or any other temperature information for the zone. In step 74, the temperature data and/or strain data generated in step 72 is compared against a threshold value (e.g., a threshold temperature value or threshold strain value). Where the temperature data and/or strain data indicates that the temperature and/or strain are below the threshold value (e.g., a threshold temperature value or threshold strain value), the operation returns to step 68. Where the temperature data and/or strain data indicates that the temperature and/or strain are above the threshold value (e.g., a threshold temperature value or threshold strain value), the operation proceeds to step 76 and the existence of the alarm condition is indicated and communicated to the cockpit and/or ground personnel.

Figure 6:
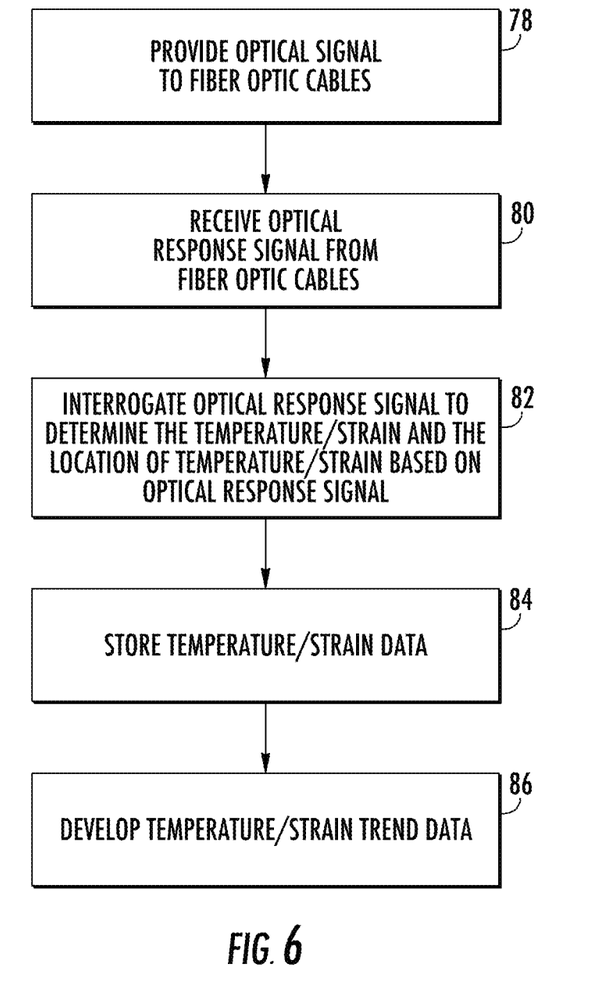
FIG. 6 is a flow diagram depicting an overheat and overstrain detection process, according to an embodiment of the present disclosure.

Referring now to FIG. 6, with continued references to FIGS. 1-5, a flow diagram illustrating a method using optical signals to provide health monitoring for an aircraft, or more specifically the landing gear 42a, 42b, utilizing optical signals is illustrated in accordance with an embodiment of the present disclosure. In step 78, an optical signal is provided to one or more fiber optic cables. In step 80, an optical response signal is received from the fiber optic cable. In step 82, the optical response signal is analyzed to determine the temperature, strain, or both experienced along the fiber optic cable. In step 84, the temperature data, strain data, or both is stored in a memory. For example, temperature data may be stored in memory 24 of the optical controller 16. In step 86, trends are developed for the stored temperature data and/or strain data, and the trends are monitored for any patterns indicating that a maintenance action is necessary.

By utilizing the fiber optic loop 18 to determine the existence of an overheat event, prior art eutectic salt sensors, and therefore the electrical connections associated with the eutectic salt sensors, may be eliminated from the aircraft 12. The prior art eutectic salt sensors sense whether an overheat event is or is not occurring, and as such provide a binary response. Unlike the prior art eutectic sensors, the fiber optic loop 18 senses any changes in temperature and/or strain and the location of the temperature change and/or strain change, not merely whether a temperature threshold value or strain threshold value has been exceeded. As such, the optical controller 16 may gather trend data for each zone that the fiber optic loop 18 extends through, as data is continuously gathered by the optical controller 16. Temperature trend data and/or strain trend data provides information to maintenance personnel regarding the overall health of each zone $Z_a$-$Z_j$. Providing the trend data allows for maintenance to be performed at specific, relevant locations and only when needed, thereby decreasing the downtime of the aircraft 12. Advantageous, in addition to providing temperature trend data, the fiber optic loop 18 is able to sense strain within each zone $Z_a$-$Z_j$, unlike the prior art eutectic salt sensors that are sensitive to temperature alone. Utilizing the fiber optic loop 18 thus provides additional structural information to maintenance personnel.

Monitoring the temperature trend, strain trend, or both within zones $Z_a$-$Z_j$ provides information regarding the overall health of the zone being monitored, and of the system within which the zone is located. The trend data can be used to facilitate preventative maintenance. Moreover, monitoring the trend data allows for maintenance actions to be scheduled at a convenient time and location, instead of waiting until an actual failure occurs, which leads to gate departure delay, cancelled flights, or in-flight crew action. In addition, monitoring the actual temperature in zones $Z_a$-$Z_j$ enables the dual overheat and strain detection system 10 to provide fire monitoring in addition to overheat detection. A sudden, dramatic increase in temperature can indicate the existence of a fire instead of an overheat event. For example, a fire in a landing gear 42a, 42b would cause a sudden, dramatic increase in temperature detected on the landing gear 42a, 42b, and that sudden, dramatic increase would be sensed by the portion of the fiber optic cable located directly on the landing gear 42a, 42b. The optical controller 16 can analyze the data provided from the zone that includes the wheel well to determine the existence of the fire event, and to communicate the existence of the fire event to the cockpit, to a fire suppression system, or to any other appropriate system or personnel.

A variety of fiber optic cables and operating principles may be used to determine the existence of an overheat event. For example, the dual overheat and strain detection system 10 may utilize a single fiber optic cable, dual fiber optic cables, and fiber optic cables including Bragg gratings. Moreover, the fiber optic cables may be arranged in a single loop configuration, a dual loop configuration, or any other suitable configuration. An optical signal is initially provided to the first fiber optic cable 26, and as the optical signal travels through the first fiber optic cable 26 the majority of the optical signal travels from the first end 28 to the second end 30, but a fraction of the optical signal is backscattered towards the first end 28. The optical controller 16 can analyze the portion of the optical signal received through the second end 30, the portion of the optical signal backscattered through the first end 28, or a combination of both to determine temperature and/or strain information. As such, it is further understood that the first fiber optic cable 26 can be arranged in a single-ended configuration where one of the first end 28 or the second end 30 is connected to the optical controller 16. In a single-ended configuration, the optical controller 16 can provide the optical signal through one end of the first fiber optic cable 26 and can interpret the portion of the optical signal backscattered through the end of the first fiber optic cable 26 connected to the optical controller 16.

Where the fiber optic loop 18 includes Bragg gratings, the optical controller 16 can analyze the optical signal using a variety of principles, including Wave Division Multiplexing (WDM), Time Division Multiplexing (TDM), a combination of WDM and TDM (WDM/TDM), and Coherent Optical Frequency Domain Reflectometry (COFDR), among others. A Bragg grating is a distributed reflector within the fiber optic cable that is configured to reflect a particular wavelength of light and allow all other wavelengths to pass through. As such, the Bragg gratings function as wavelength-specific reflectors. The specific wavelength reflected by a specific Bragg grating is the Bragg wavelength. In the dual overheat and strain detection system 10, the fiber optic loop 18 includes various Bragg gratings within the first fiber optic cable 26. Different Bragg gratings may be disposed within different zones in the aircraft. As such, the Bragg wavelength associated with each zone differs from the Bragg wavelength associated with the other zones. Because the optical controller 16 knows which Bragg wavelength is associated with which zone, the optical controller 16 may determine the distance to each Bragg grating based on the time taken for the Bragg wavelength to travel from the first end 28, to the Bragg grating, and back to the first end 28. The Bragg wavelength is sensitive to both strain and temperature. Changes in strain and temperature result in a shift in the Bragg wavelength, which can be detected by the optical controller 16 and used to determine the change in strain and/or temperature.

In WDM, the optical controller 16 provides an optical signal to the first end 28 of the first fiber optic cable 26 with the optical transmitter 20. The optical transmitter 20 is preferably a tunable, swept-wavelength laser. The wavelength of the optical transmitter 20 is swept across a predefined range. The wavelength of the optical signal being transmitted at any given moment in time is known. The Bragg wavelengths are received at the first end 28 of the first fiber optic cable 26 by the optical receiver 22, and the optical controller 16 converts changes in the Bragg wavelengths into intensity vs. time. A shift in the Bragg wavelength indicates a change in temperature and/or strain, and tracking the changes in the Bragg wavelength allows the optical controller 16 to determine the temperature at each Bragg grating within each zone Z1-Zn.

In TDM, the optical controller 16 provides an optical signal to the first end 28 of the first fiber optic cable 26 with the optical transmitter 20. In TDM, the optical transmitter 20 is a broadband laser light source such that a multitude of wavelengths are transmitted through the first fiber optic cable 26. Each Bragg grating is configured to reflect a particular Bragg wavelength. The optical controller 16 monitors the time required for the each Bragg wavelength to return to the first end 28. The time required for each Bragg wavelength to return to the first end 28 provides the location of each Bragg grating in the first fiber optic cable 26. Having established the location of each Bragg grating in the first fiber optic cable 26, the optical transmitter 20 provides pulses through the first fiber optic cable 26. The wavelength of each pulse can be determined when the pulse arrives back the optical controller 16. Changes in the wavelength are detected and converted to intensity verses time, thereby allowing the optical controller 16 to determine the temperature at the location of each Bragg grating in the first fiber optic cable 26.

In WDM/TDM, the optical controller 16 provides optical signals through the first fiber optic cable 26 utilizing both a tunable, swept-wavelength laser and a broadband laser light source. Similar to both WDM and TDM, in WDM/TDM the reflected Bragg wavelengths are monitored for any changes in the wavelengths. The changes in the wavelengths are converted to intensity verses time, thereby allowing the optical controller 16 to determine the temperature at the location of each Bragg grating. WDM/TDM reduces the loss of any signal in the Bragg Grating is reduced and the total wavelength that must be scanned to interrogate the Bragg wavelength is similarly reduced.

In COFDR, the optical transmitter 20 is preferably a tunable pulse laser. The fiber optic loop 18 includes the first fiber optic cable 26 and a reference fiber optic cable running parallel to the first fiber optic cable 26. It is understood that the optical controller 16 may include a first optical transmitter dedicated to the first fiber optic cable 26 and a second optical transmitter dedicated to the reference fiber optic cable. Both the first fiber optic cable 26 and the reference fiber optic cable 62 include Bragg gratings at the same distance within the fiber optic cable from the optical transmitter 20. The reflected Bragg wavelengths from the first fiber optic cable 26 and the reference fiber optic cable are combined by the optical controller 16 and the combined signals are analyzed. The optical controller 16 may perform an Inverse Fast Fourier Transform (IFFT) on the fringe interference pattern to obtain the location and frequencies of the reflected Bragg wavelengths. Temperature changes cause the Bragg wavelength to shift, and the shift in the Bragg wavelength is analyzed by the optical controller 16 to determine the temperature shift, and thereby whether an overheat event has occurred. In addition, the location of the overheat event is detected by the optical controller 16 based on the shift in a particular Bragg wavelength, as the location of a Bragg grating associated with a Bragg wavelength is known.

Where the fiber optic loop 18 is a continuous fiber optic loop, the optical controller 16 can analyze the optical signal using any suitable method, including Optical Time Domain Reflectometry (OTDR), COFDR, Brillouin Optical Frequency Domain Analysis (BOFDA), Brillouin Optical Time Domain Analysis (BOTDA), Incoherent Optical Frequency Domain Reflectometry (IOFDR) utilizing a Swept Frequency Methodology, and IOFDR utilizing a Step Frequency Methodology.

In OTDR, the optical controller 16 commands the optical transmitter 20 to send a single laser pulse, having a fixed wavelength, down the first fiber optic cable 26. In one example, Raman scattering, which is the inelastic scattering of a photon upon interaction with matter, that occurs is utilized to determine temperature. It is understood, however, that in addition to determining temperature along the fiber optic loop 18, OTDR can be utilized to locate the occurrence of an event at a location along the fiber optic loop 18. In Raman scattering, the scattered photons have a different wavelength than the incident photons. Raman scattering includes two types of scattering, Stokes scattering, whereby the scattered photon has a longer wavelength, and thus less energy, than the incident photon, and anti-Stokes scattering, whereby the scattered photon has a shorter wavelength, and thus more energy, than the incident photon. The intensity of the anti-Stokes band is temperature dependent, while the intensity of the Stokes band is temperature insensitive. As such, a ratio of the Stokes to anti-Stokes components is measured to determine the temperature at locations along the fiber optic loop 18. The location of the temperature shift may be determined by the time required for the backscattered photons to return to the optical controller 16.

In addition to using COFDR to analyze optical signals sent through fiber optic cables that include Bragg gratings, COFDR may be used to analyze optical signals sent through fiber optic cables not including Bragg gratings. Similar to COFDR for fiber optic cables including Bragg gratings, COFDR for fiber optic cables without Bragg gratings includes using a the fiber optic loop 18 having the first fiber optic cable 26 and a reference fiber optic cable running parallel to the first fiber optic cable 26. As the optical signal is transmitted through the first fiber optic cable 26, some photons are backscattered and reflected back the optical controller 16. Similarly, as the reference signal is transmitted through the reference cable, some reference photons are backscattered and reflected back to the optical controller 16. The optical controller 16 combines the backscattered optical signal and the backscattered reference signal and the combined signals create an interference pattern. The optical controller 16 may perform an Inverse Fast Fourier Transform (IFFT) on a fringe interference pattern to obtain the location and frequencies of the reflected wavelengths to create a Rayleigh fingerprint. Temperature changes cause the Rayleigh fingerprint to stretch, thereby shifting the reflected wavelength. The shift in the reflected wavelength is analyzed by the optical controller 16 to determine temperature shift, strain shift, or both, and the optical controller 16 may thereby determine whether an overheat event has occurred.

In both BOFDA and BOTDA, an optical signal is provided to the first end 28 of the first fiber optic cable 26 and a probe signal is simultaneously provided to the second end 30 of the first fiber optic cable 26. The optical controller 16 controls both the optical transmitter 20 and a probe transmitter. The optical transmitter 20 is preferably a pump laser configured to provide laser pulses to the first end 28 of the first fiber optic cable 26. The probe transmitter provides a continuous wave to the second end 30 of the first fiber optic cable 26. The optical signal interacts with the probe signal, and a frequency difference between the optical signal and the purge signal is the Brillouin frequency. Changes in the Brillouin frequency are recorded over time, which allows the optical controller 16 to determine the temperature at a given location along the first fiber optic cable 26 and determine the distance that the given location is from the first end 28 or the second end 30. In BOFDA, the optical controller 16 analyzes the resultant Brillouin frequency with respect to frequency, while in BOTDA the optical controller 16 analyzes the resultant Brillouin frequency with respect to changes over time.

In IOFDR, a pulsed optical signal is provided to the first fiber optic cable 26 by the optical transmitter 20. The pulsed optical signal is intensity modulated at constant amplitude. IOFDR may utilize a swept-frequency methodology or a step-frequency methodology. In the swept-frequency methodology, a frequency of the optical signal provided by the optical transmitter 20 is swept continuously across a specified frequency range. In the step-frequency methodology, the frequency of the optical signal provided by the optical transmitter 20 is altered periodically in incremental steps over a specified frequency range.

In IOFDR using either the swept-frequency methodology or the step-frequency methodology Raman scattering is utilized to determine the temperature along the first fiber optic cable 26. As discussed above, Raman scattering includes two component types of scattering, a Stokes component and an anti-Stokes component. The Stokes component includes scattered photons that have a longer wavelength, and thus less energy, than the incident photon. The anti-Stokes component includes scattered photons that have a shorter wavelength, and thus more energy, than the incident photon. The anti-Stokes component is temperature dependent, while the Stokes band is temperature insensitive. The intensity of the backscattered Raman signal, which is a combination of Stokes and anti-Stokes components, is measured as a function of frequency. The optical controller 16 performs an IFFT to convert the signal frequency to the space domain, from which the temperature is calculated. The ratio of Stokes to anti-Stokes intensities eliminates any non-temperature related variations to the signal, thereby giving a temperature reading unaffected by noise.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for an aircraft that includes a plurality of zones, the system comprising:
    a first fiber optic cable routed through a zone of the plurality of zones, wherein the first fiber optic cable is attached to a landing gear of the aircraft in the zone of the plurality of zones; and
    a first controller configured to provide a first optical signal to the first fiber optic cable and obtain a first optical response signal from the first fiber optic cable;
    wherein the first controller is further configured to determine at least one temperature within the zone of the plurality of zones based on the first optical response signal, the first optical signal, and coherent optical frequency domain reflectometry (COFDR),
    wherein the first controller is further configured to determine at least one strain within the zone of the plurality of zones based on the first optical response signal, the first optical signal and COFDR,
    wherein the first fiber optic cable is located in an outer tube that is attached to the landing gear,
    wherein in locations of the landing gear where strain is desired to be detected, the fiber optic loop is attached to the landing gear without overstuffing or excess fiber length in the outer tube, and
    wherein in locations of the landing gear where temperature is desired to be detected, the fiber optic loop is overstuffed or manufactured with excess fiber length inside the outer tube.

2. The system of claim 1, wherein the first controller is further configured to provide an indication that the at least one temperature is greater than a threshold temperature value within the zone of the plurality of zones.

3. The system of claim 1, wherein the first controller is further configured to provide an indication that the at least one strain is greater than a threshold strain value within the zone of the plurality of zones.

4. The system of claim 1, wherein the first fiber optic cable is routed through a second zone of the plurality of zones.

5. The system of claim 4, wherein the second zone of the plurality of zones is one of a bleed air duct, a cross-over bleed air duct, wing box, air conditioning system, anti-icing system or nitrogen generation system.

6. The system of claim 5, wherein the second zone of the plurality of zones is a bleed air duct.

7. The system of claim 1, further comprising:
    a second fiber optic cable routed through a second zone of the plurality of zones; and
    a second controller configured to provide a second optical signal to the second fiber optic cable and obtain a second optical response signal from the second fiber optic cable;
    wherein the second controller is further configured to determine at least one temperature within the second zone of the plurality of zones based on the second optical response signal and provide an indication for second detected zones of the second zone of the plurality of zones in which the at least one temperature is greater than a threshold temperature value.

8. The system of claim 7, further comprising:
    a main controller configured to communicate with the first controller and the second controller, wherein the first controller and the second controller provide to the main controller the at least one temperature within the zone of the plurality of zones and the at least one temperature within the second zone of the plurality of zones.

9. The system of claim 1, wherein the first fiber optic cable includes fiber Bragg gratings, and wherein the first controller is configured to control an optical transmitter to provide the optical signal as a tunable swept-wavelength laser and/or a broadband laser and is configured to determine the at least one temperature within the zone of the plurality of zones using time division multiplexing (TDM) and/or wavelength division multiplexing (WDM).

10. A method of detecting thermal conditions for an aircraft, the method comprising:
  emitting, by a first controller, a first optical signal using a broadband laser to a first fiber optic cable that includes fiber Bragg gratings, wherein the first fiber optic cable is routed through a zone of a plurality of zones of the aircraft, and wherein the first fiber optic cable is attached to a landing gear of the aircraft in the zone of the plurality of zones;
  receiving, by the first controller, a first optical response signal from the first fiber optic cable based upon the first optical signal; and
  determining, using the first controller, at least one temperature within the zone of the plurality of zones based on the first optical response signal, the first optical signal, and coherent optical frequency domain reflectometry (COFDR); and
  determining, using the first controller, at least one strain within the zone of the plurality of zones based on the first optical response signal, the first optical signal, and COFDR,
  wherein the first fiber optic cable is located in an outer tube that is attached to the landing gear,
  wherein in locations of the landing gear where strain is desired to be detected, the fiber optic loop is attached to the landing gear without overstuffing or excess fiber length in the outer tube, and
  wherein in locations of the landing gear where temperature is a desired to be detected, the fiber optic loop is overstuffed or manufactured with excess fiber length inside the outer tube.

11. The method of claim 10, further comprising:
  indicating a first condition for the zone of the plurality of zones if the at least one temperature within the zone of the plurality of zones is greater than a threshold temperature value.

12. The method of claim 10, wherein emitting, by the first controller, the first optical signal comprises emitting laser pulses having a constant amplitude using a step frequency methodology.

13. The method of claim 10, wherein determining, using the first controller, the at least one temperature of each of the first plurality of zones comprises determining the at least one temperature based on optical frequency domain reflectometry (IOFDR).

14. The method of claim 10, wherein the first fiber optic cable is routed through a second zone of a plurality of zones of the aircraft.

15. The method of claim 14, further comprising:
  determining, using the first controller, at least one temperature within the second zone of the plurality of zones based on the first optical response signal, the first optical signal, and COFDR.

16. The method of claim 14, further comprising:
  determining, using the first controller, at least one strain within the second zone of the plurality of zones based on the first optical response signal, the first optical signal, and COFDR.

17. The method of claim 14, wherein the second zone of the plurality of zones is one of a bleed air duct, a cross-over bleed air duct, wing box, air conditioning system, anti-icing system or nitrogen generation system.

18. The method of claim 17, wherein the second zone of the plurality of zones is a bleed air duct.

* * * * *